(12) United States Patent
Peng et al.

(10) Patent No.: US 7,672,198 B2
(45) Date of Patent: Mar. 2, 2010

(54) OPTICAL PICKUP HEAD AND ELECTROMAGNETIC ACTUATING DEVICE THEREOF

(75) Inventors: Ming-Tsan Peng, Hsinchu (TW); Chun-Te Wu, Hsinchu (TW); Chi-Shen Chang, Hsinchu (TW); Kwen-Jin Lee, Hsinchu (TW); Tzuan-Ren Jeng, Hsinchu (TW); Lei-Ming Yang, Hsinchu (TW); Chau-Yuan Ke, Hsinchu (TW); Jau-Jiu Ju, Hsinchu (TW); Shyh-Jier Wang, Hsinchu (TW); Hai-Jo Huang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 446 days.

(21) Appl. No.: 11/727,821

(22) Filed: Mar. 28, 2007

(65) Prior Publication Data

US 2008/0163279 A1 Jul. 3, 2008

(30) Foreign Application Priority Data

Dec. 27, 2006 (TW) .............................. 95149334 A (51) Int. Cl.
*G11B 7/00* (2006.01)
(52) U.S. Cl. .................. 369/44.22; 369/44.14
(58) Field of Classification Search ........................ None
See application file for complete search history.

(56) References Cited

U.S. PATENT DOCUMENTS

| 5,150,343 | A  | * | 9/1992  | Goto et al. ............... 369/44.22 |
| 5,881,033 | A  | * | 3/1999  | Murakami et al. ........ 369/44.14 |
| 6,212,140 | B1 | * | 4/2001  | Kimura et al. ........... 369/44.15 |
| 2003/0147336 | A1 | * | 8/2003 | Yoshinaga .................. 369/244 |
| 2005/0007906 | A1 | * | 1/2005 | Horinouchi et al. ...... 369/44.37 |
| 2005/0243442 | A1 | * | 11/2005 | Yabe et al. .................. 359/819 |
| 2006/0233067 | A1 | * | 10/2006 | Kim et al. ................ 369/44.14 |

OTHER PUBLICATIONS

Ming-Tsan Peng et al. Asia-Pacific Data Storage Conference, Aug. 28-Aug. 30, 2006, p. 80-81.

* cited by examiner

*Primary Examiner*—Paul Huber
(74) *Attorney, Agent, or Firm*—Birch, Stewart, Kolasch & Birch, LLP (57) ABSTRACT

An optical pickup head and an electromagnetic actuating device thereof are provided. The electromagnetic actuating device is used to move an objective lens carrier having an objective lens assembly to form an optical pickup head. The electromagnetic actuating device includes at least a magnet, at least a coil, and at least a yoke. The magnet is spaced apart from the objective lens carrier by a distance, and the coil is disposed at the objective lens carrier, for generating an electromagnetic force to interact with the magnet. The yoke is spaced apart from the objective lens carrier by a distance, in which the yoke has a protruding part that extends towards the objective lens carrier and is used to attract magnetic flux lines produced by the magnet, and thus making the magnetic flux that passes through the coil be distributed evenly.

8 Claims, 11 Drawing Sheets

OPTICAL PICKUP HEAD AND ELECTROMAGNETIC ACTUATING DEVICE THEREOF

CROSS-REFERENCE TO RELATED APPLICATIONS

This non-provisional application claims priority under 35 U.S.C. §119(a) on Patent Application No(s). 095149334 filed in Taiwan, R.O.C. on Dec. 27, 2006, the entire contents of which are hereby incorporated by reference.

BACKGROUND OF THE INVENTION

1. Field of Invention

The present invention relates to an actuating device of an optical pickup head. More particularly, the present invention relates to an electromagnetic actuating device that makes magnetic flux lines be distributed evenly.

2. Related Art

When a compact disc is placed in an optical disc drive, the optical pickup head of the optical disc drive will move along a guide rail to read the data of the compact disc, and then transmit them to the chipset at the host terminal for signal processing. In this course, since the compact disc is rotating at a high speed, and the compact disc itself is not in a perfect round shape, the rails on the compact disc are easily runout. Therefore, the optical pickup head must have a quick-response actuator for quickly moving the objective lens of the optical pickup head to focus on the predetermined rail.

In order to make the objective lens accurately focus on the rail on the compact disc that is predetermined to be read/written, the optical pickup head must have three actuating modes: (1) focusing: accurately controlling the distance between the objective lens of the pickup head and the surface of the compact disc to make the focus of the laser beam fall on the rail; (2) tracking: moving the objective lens horizontally to make the focus of the laser beam fall on the center of the rail, without going beyond the rail, or falling on the neighboring rail; (3) inclining: since the aberration caused by the distortion of the compact disc makes the focus of the laser beam move, the incident angle of the laser beam must be changed through inclining objective lens, so as to adjust the aberration caused by the distortion.

Figure 1:
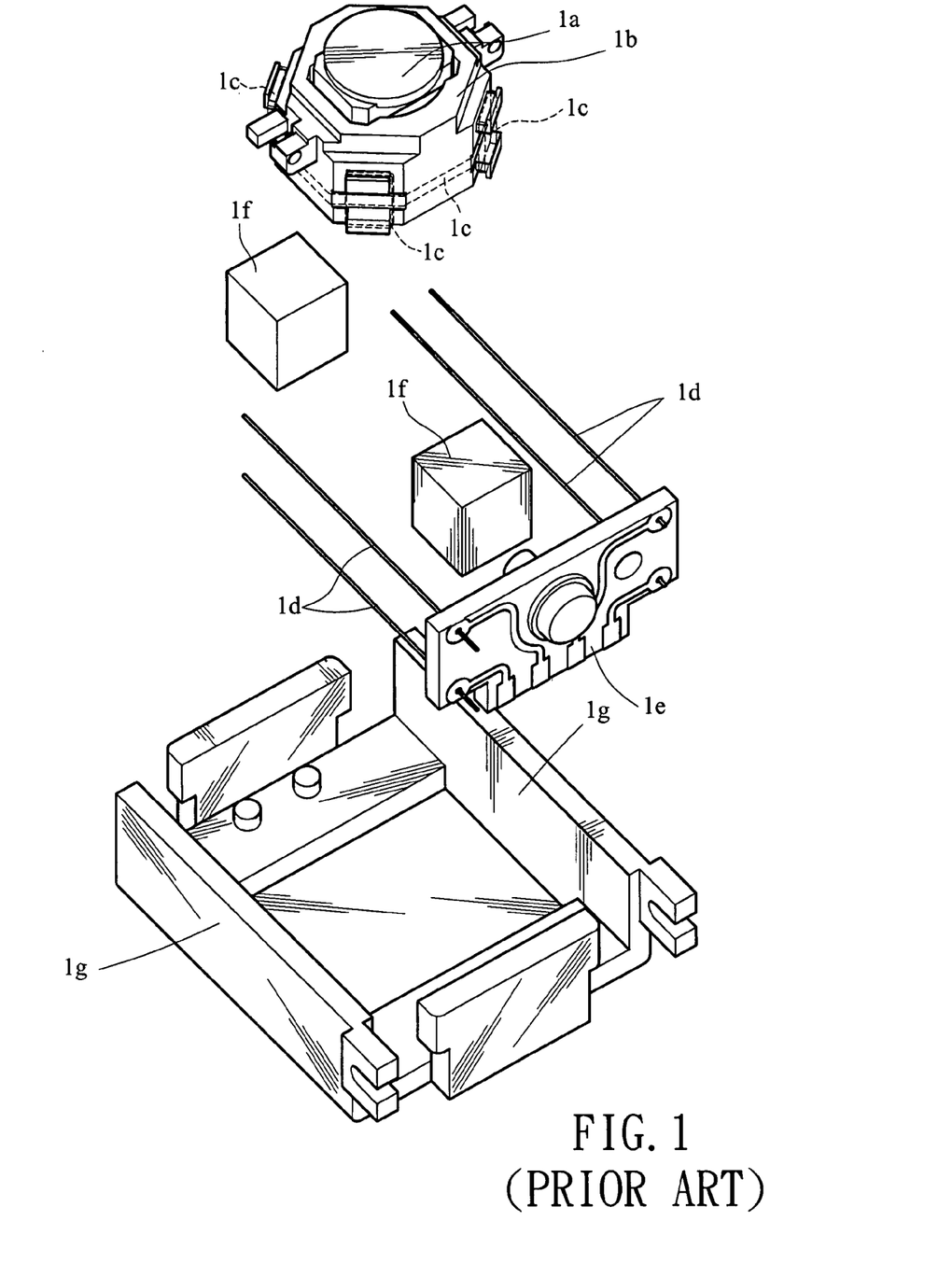
FIG. 1 is an exploded isometric diagram of the conventional art.
Figure 2:
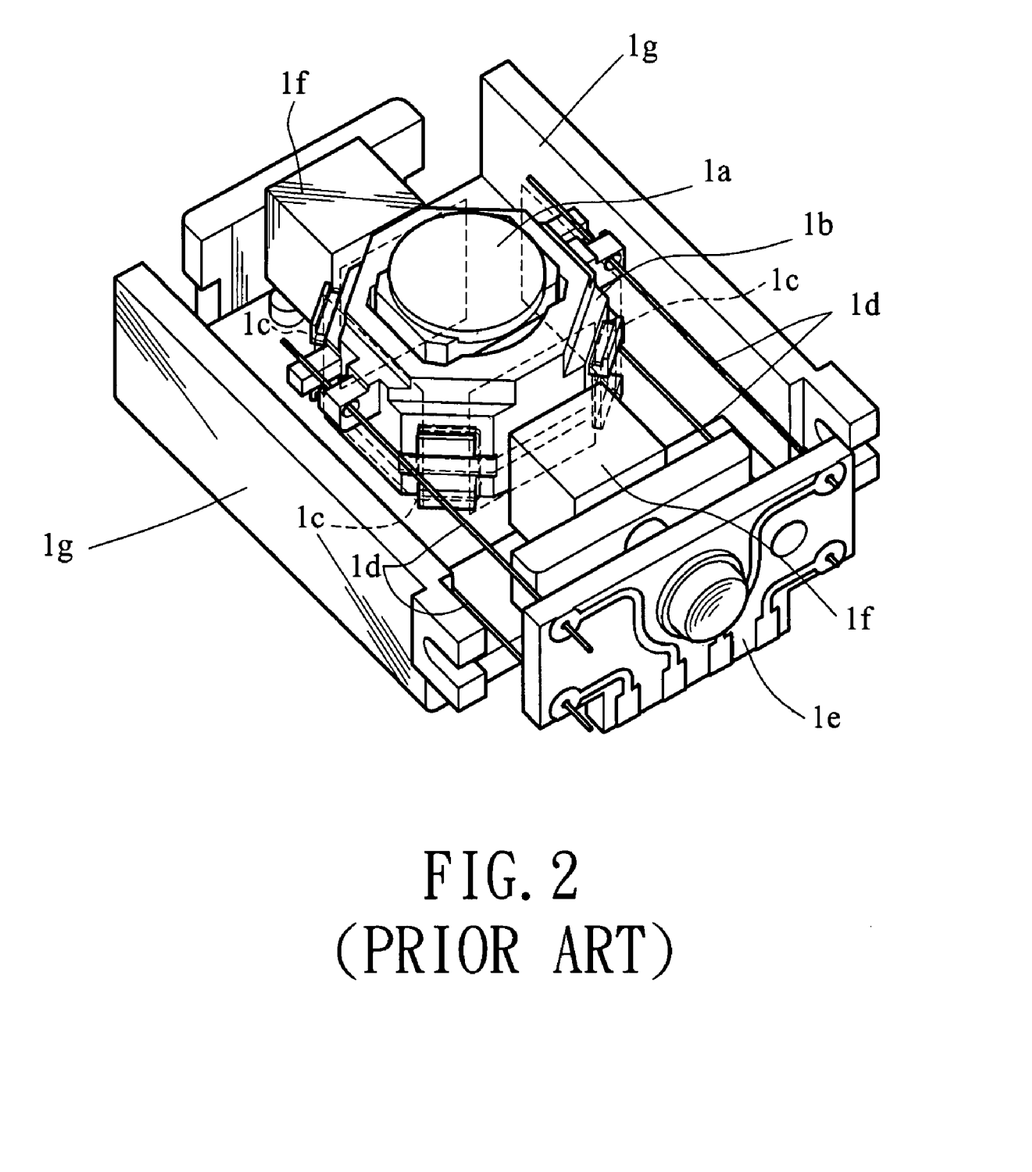
FIG. 2 is an isometric diagram of the conventional art.

Referring to FIG. 1 and FIG. 2, they show a conventional optical pickup head actuator. A plurality of coils $1c$ is disposed around the objective lens carrier $1b$ that supports an objective lens $1a$. The objective lens carrier $1b$ suspends under the support of the metal line $1d$, and the metal line $1d$ receives electric power from the circuit board $1e$ and transmits it to the coil $1c$, such that the coil $1c$ generates an electromagnetic force to make an interaction with the magnet $1f$, so as to drive the objective lens carrier $1b$ to move.

Both sides of the objective lens carrier $1b$ are directly clad and clamped by the magnet $1f$, such that the magnet interacts with the coil $1c$ on the objective lens carrier $1b$, so as to drive the objective lens carrier $1b$ to move. On the other aspect, in order to enable the objective lens carrier $1b$ to move in the other horizontal direction, magnetic flux lines are guided to enter the objective lens carrier $1b$ from different directions by means of a yoke $1g$, and to interact with an effective region of the coil $1c$ in the other direction, so as to drive the objective lens carrier $1b$ to move in the other horizontal direction.

Figure 3:
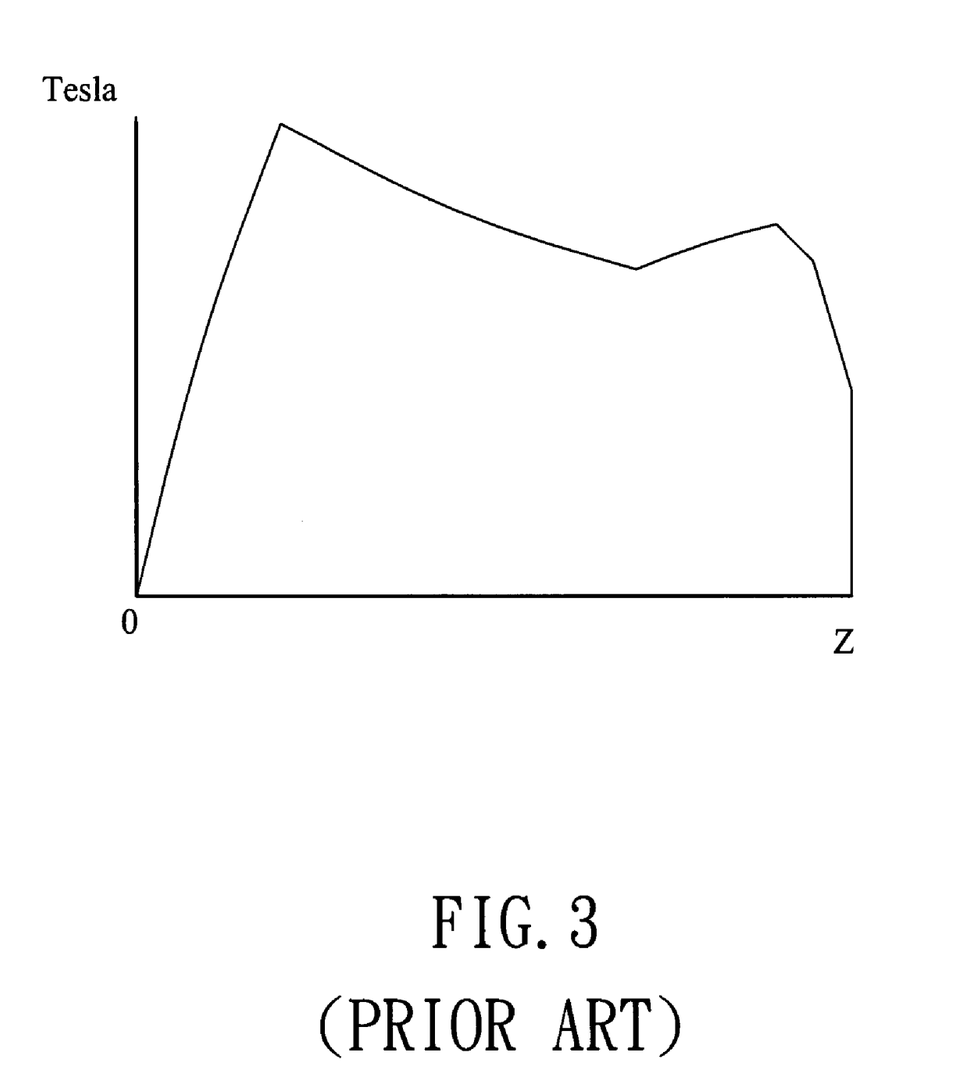
FIG. 3 is a graph chart of the distribution of the magnetic flux in the vertical direction that passes through the tracking coils in the conventional art.

Referring to FIG. 3, it shows the change of the magnetic flux (Tesla) along a vertical direction Z that passes through the coil $1c$. The magnetic flux lines guided by the yoke $1g$ are divergently distributed in a vertical direction. When the objective lens carrier $1b$ drives the coil $1c$ to change its position in the vertical direction, the magnetic flux of the magnetic flux lines that pass through the coil $1c$ will be significantly changed, such that the coil $1c$ drives the objective lens carrier $1b$ to change, and thus the expected displacement or moving speed cannot be achieved. If the magnetic fluxes that pass through the opposite coils $1c$ are not consistent, during the tracking operation, forces impinged to both sides of the objective lens carrier $1b$ are inconsistent, and if both of the forces do not pass the mass center of the objective lens carrier $1b$, they will produce a force moment to make the objective lens carrier $1b$ be unexpectedly inclined.

The conventional solution to the unexpected inclination problem lies in adjusting the height of the magnet $1f$, and adding a heavy chunk to the objective lens carrier $1b$ to adjust the position of the mass center, in order to make the force applied by the magnetic flux lines pass through the mass center of the objective lens carrier $1b$, and thereby preventing the magnetic force from producing a force moment on the objective lens carrier $1b$. However, through this method, the applied force of the magnetic flux lines cannot pass through the mass center after the objective lens carrier $1b$ makes a vertical movement, which causes the forces impinged on two sides of the objective lens carrier $1b$ be inconsistent, and thus, the force moment occurs.

SUMMARY OF THE INVENTION

In view of the above problems, the present invention provides an optical pickup head and an electromagnetic actuating device thereof, which are capable of making the magnetic flux (Tesla) that passes through coils be distributed evenly, and forces applied by different coils to the objective lens carrier are balanced through a plurality of coils interacted with identical or similar magnetic flux lines.

The present invention provides an electromagnetic actuating device, which is applicable for moving an objective lens carrier having an objective lens assembly, so as to form an optical pickup head. The electromagnetic actuating device comprises at least a magnet, at least a coil and at least a yoke. Herein, the yoke is used for conducting magnetic fluxes. The magnet is spaced apart from the objective lens carrier by a distance, and the coil is disposed on the objective lens carrier, for generating an electromagnetic force to interact with the magnet. The yoke is spaced apart from the objective lens carrier by a distance, in which the yoke has a protruding part that extends towards the objective lens carrier to attract magnetic flux lines produced by the magnet, and thus making the magnetic flux that passes through the coil be distributed evenly.

In the present invention, the magnetic flux lines are attracted through the protruding part, such that the magnetic flux of the magnetic flux lines sent out from the yoke and passing through the coils be distributed more evenly, and thus, after the coils move vertically, they are still under the consistent magnetic flux, which makes the magnitude of the electromagnetic force generated by the coils be less affected by the position or the size tolerance of the elements.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The above description of the content of the present invention and the following detailed description of the present invention are used to demonstrate and explain principles of the present invention and to provide a further explanation for the claims of the present invention.

BRIEF DESCRIPTION OF THE DRAWINGS

The present invention will become more fully understood from the detailed description given herein below for illustration only, which thus is not limitative of the present invention, and wherein.

DETAILED DESCRIPTION OF THE INVENTION

In order to make objectives, constructions, features, and functions of the present invention be more comprehensible, a detailed description is given below through the embodiments.

Figure 4:
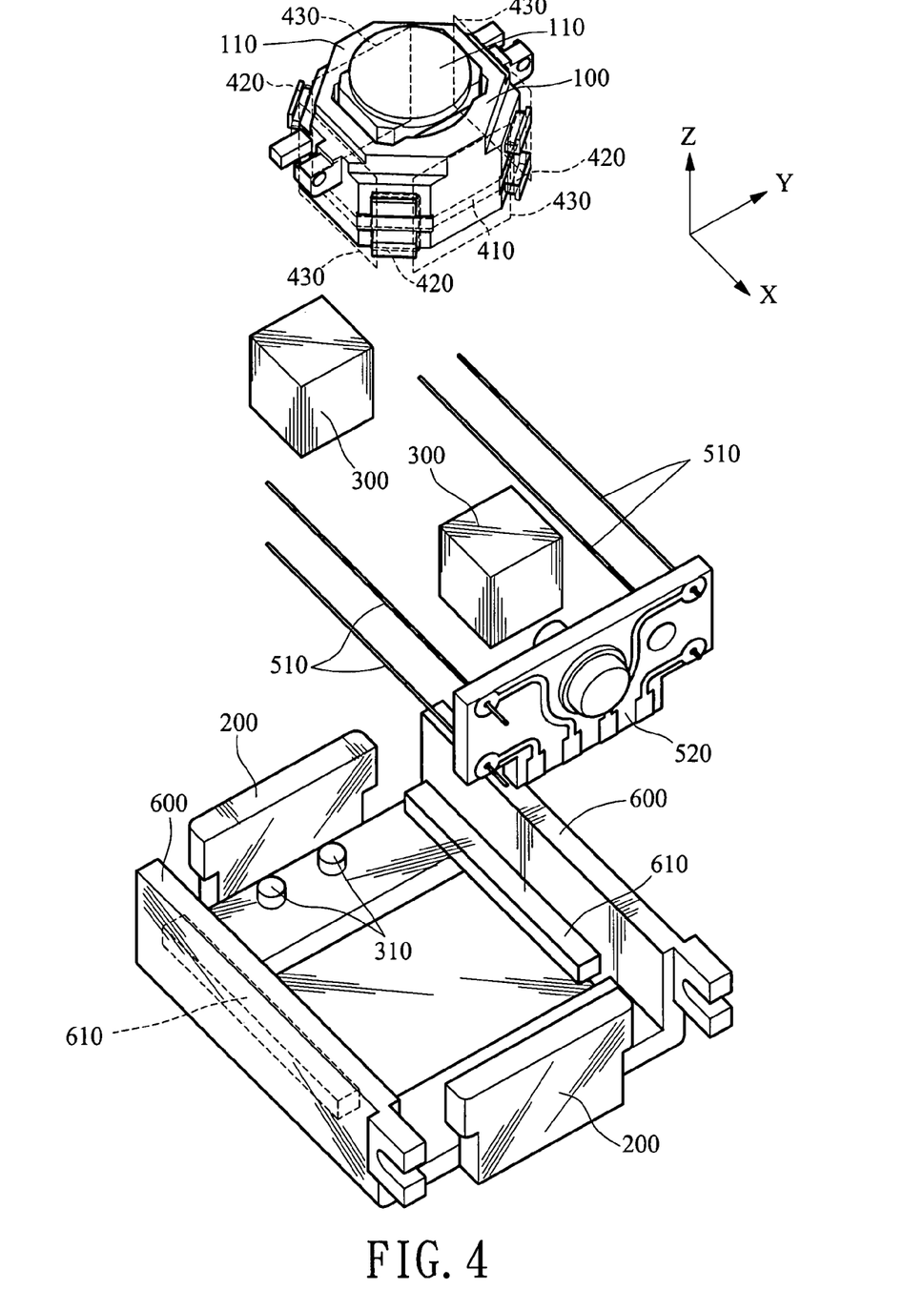
FIG. 4 is an exploded isometric diagram of a first embodiment of the present invention.
Figure 5:
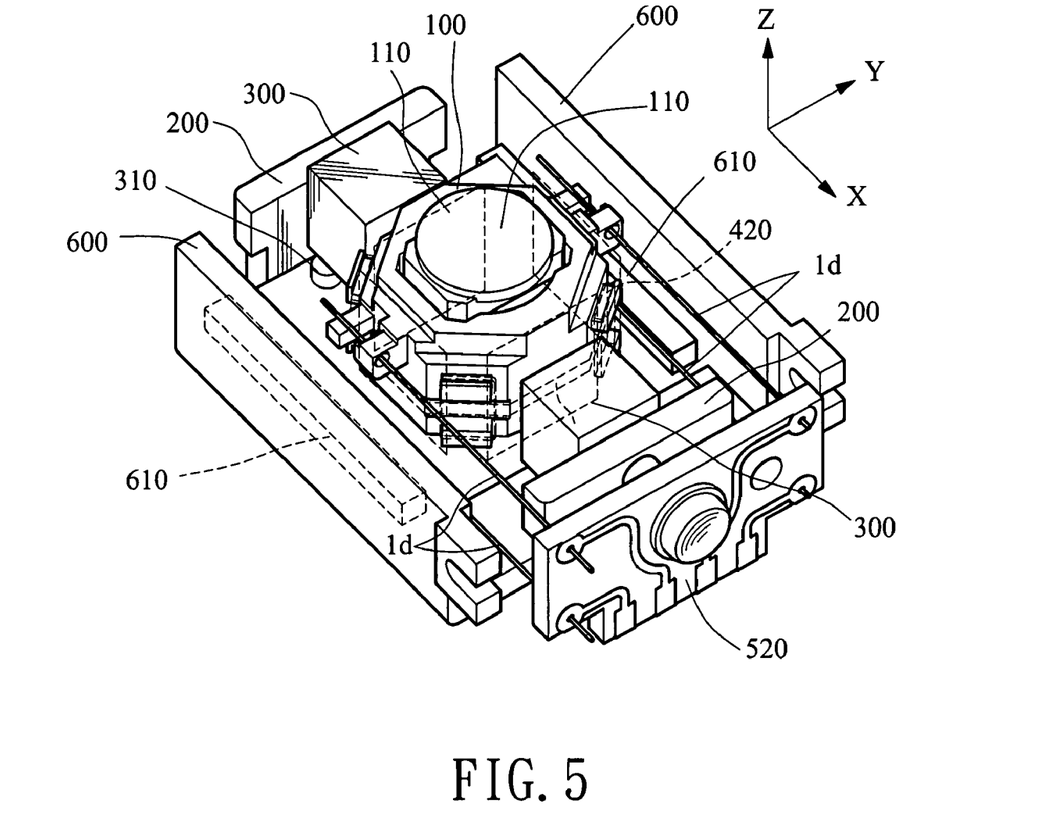
FIG. 5 is an isometric diagram of the first embodiment of the present invention.

Referring to FIG. 4 and FIG. 5, they show an electromagnetic actuating device of a first embodiment of the present invention, which is applied to an optical pickup head to move the objective lens assembly 110 of the optical pickup head to a predetermined position, so as to read and write data for the optical storage medium.

The optical pickup head includes an objective lens carrier 100, two supporting yokes 200, two magnets 300, a plurality of coils, a plurality of metal lines 510, one circuit board 520, and two yokes 600. Herein, the yoke 600 is used for conducting magnetic fluxes. To facilitate the description, in the drawings, a vertical direction Z extending up and down, a first horizontal direction X and a second horizontal direction Y that are vertical to the vertical direction Z are predetermined.

The objective lens carrier 100 is used to carry the objective lens assembly 110, such that the optical axis of the objective lens carrier assembly 110 is substantially parallel to the vertical direction Z, or forms a slight varied angle with the vertical direction Z. As the motion of the objective lens carrier 100, the objective lens assembly 110 can make such operations as focusing, tracking, and inclining, so as to focus the reading and writing light beams on a predetermined position on the optical storage medium.

The two supporting yokes 200 are arranged along the first horizontal direction X and spaced apart from each other by the objective lens carrier 100, such that the objective lens carrier 100 is located between the two supporting yokes 200. The supporting yokes 200 are used to support the magnet 300 and guide the magnetic flux lines produced by the magnet 300 to a predetermined direction, so as to make the magnetic flux lines be guided to the yoke 600. The two magnets 300 are respectively fixed on inner surfaces of the two supporting yokes 200 facing each other, such that the two magnets 300 are spaced apart from the objective lens carrier 100 for a distance along the first horizontal direction X. The objective lens carrier 100 is located between the two magnets 300 and influenced by the magnetic flux lines produced by the two magnets 300. A fixing post 310 can be further disposed at the bottom of the magnet 300 to fix the magnet 300 on the inner surface of the supporting yoke 200 and adjust the height of the magnet 300, and thereby changing the distribution of magnetic flux lines in the vertical direction Z.

The coils are winded into a ring shape, and an objective lens carrier 100 is disposed. Upon being powered on, each coil can interact with the magnet 300 to generate an electromagnetic force for driving the objective lens carrier 100 to move. A plurality of coils includes at least a focusing coil 410 and a plurality of tracking coils 420, among which the focusing coil 410 either winds around the external edge of the objective lens carrier 100 or disposed on the top surface and bottom surface of the objective lens carrier 100, such that the normal direction of the focusing coil 410 is parallel to the vertical direction Z to drive the objective lens carrier 100 to make focusing operation along the vertical direction Z. The tracking coils 420 are disposed around the external surface of the objective lens carrier 100 and winds around a reel on the external surface of the objective lens carrier 100, such that the normal direction of the tracking coil 420 is vertical to the vertical direction Z and parallel to a plane formed by the first horizontal direction X and the second horizontal direction Y. The normal direction of each of the tracking coils 420 forms an angle of 45 degrees with the first horizontal direction X and the second horizontal direction Y respectively, such that the effective tracking coil 430 with the composite normal direction facing the first horizontal direction X and the second horizontal direction Y among the tracking coils is interacted with the magnet 300 to drive the objective lens carrier 100 to move on the plane formed by the first horizontal direction X and the second horizontal direction Y; and of course, the normal direction of the tracking coil 420 can be made to directly face the first horizontal direction X and the second horizontal direction Y, such that different tracking coils 420 are interacted with different magnets 300.

The circuit board 520 is fixed on one of the supporting yokes to receive an electric power input from the external device. One end of the metal line 510 is fixed on the circuit board 520 and electrically connected to the circuit board 520 to receive the electric power, and the other end of the metal line 510 is fixed on the objective lens carrier 100 and electrically connected to the focusing coil 410 and a plurality of tracking coils 420 respectively. The metal line 510 can support the objective lens carrier 100 to make the objective lens carrier 100 be suspended and transmit the electric power to the focusing coil 410 and the tracking coils 420, such that the focusing coil 410 and the tracking coils 420 generate an electromagnetic force to interact with the magnet 300 to drive the objective lens carrier 100 to move.

The two yokes 600 are arranged along the second horizontal direction Y and spaced apart from each other by the objective lens carrier 100, such that the objective lens carrier 100 is located between the two yokes 600 to form a configuration that the two magnets 300 and the two yokes 600 surround the objective lens carrier 100, which guides the magnetic flux lines of the magnet 300 towards the objective lens carrier 100 and the effective tracking coil 430 along the second horizontal direction Y, and thereby preventing the magnetic flux lines produced by the magnet 300 from radiating outside.

Figure 6:
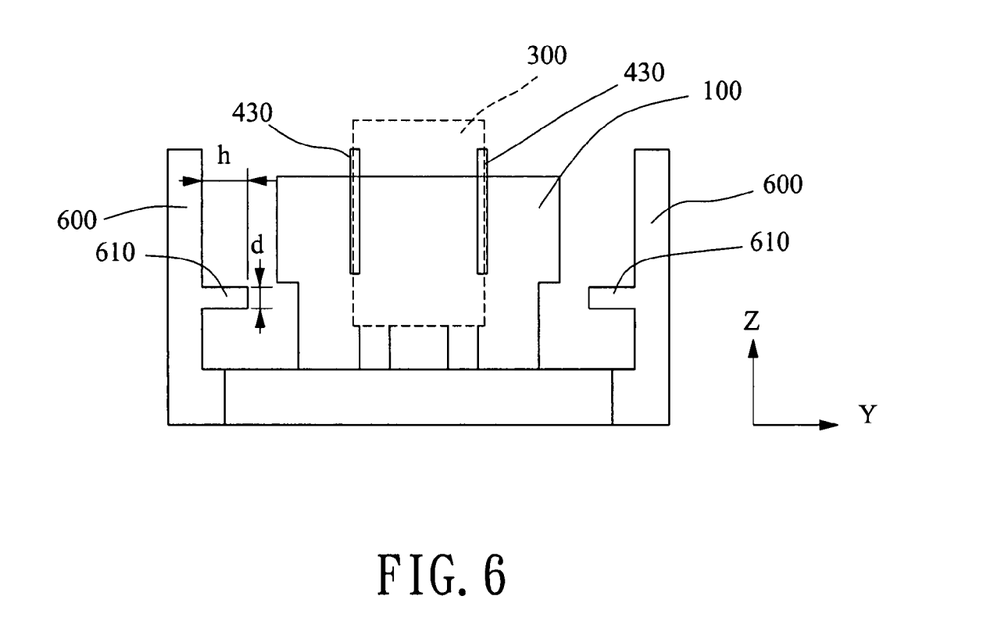
FIG. 6 is a front view of the first embodiment of the present invention.
Figure 7:
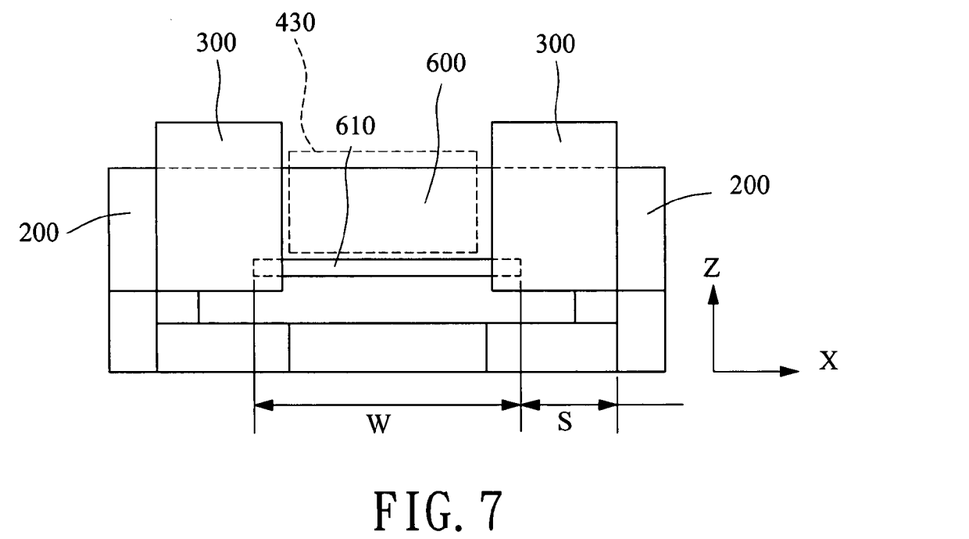
FIG. 7 is a side view of the first embodiment of the present invention.

Referring to FIG. 6 and FIG. 7, the yoke 600 is parallel to the first horizontal direction X, and a protruding part 610 is protruded from the inner surface of the yoke 600 to extend towards the objective lens carrier 100. The protruding part 610 is in the shape of a long sheet extending along the first horizontal direction X to attract the magnetic flux lines produced by the magnet 300, such that the magnetic flux lines along the vertical direction Z are distributed more evenly, and the effective tracking coil 430 is located in a magnetic field where the magnetic flux lines are distributed evenly.

The length W of the protruding part 610 at the first horizontal direction X is preferably larger than that of the effective tracking coil 430, and the distance S between the end of the protruding part 610 and the supporting yoke needs to be smaller than the thickness of the magnet 300, so as to make the magnet 300 fall within the range of the protruding part 610. The height of the protruding part 610 must be designed to be lower than that of the bottom surface of the effective tracking coil 430, such that all the magnetic flux lines attracted by the protruding part can pass through the effective tracking coil 430. In addition, as for the convergence of the magnetic flux lines, the larger the thickness d of the protruding part 610 is, the better the attraction effect will be, but if the thickness d is excessively large, the magnetic flux lines will be excessively concentrated on the protruding part 610, such that the magnetic flux lines cannot be distributed evenly. Meanwhile, the larger the height h at which the protruding part 610 protrudes from the yoke 600, the closer the front edge of the protruding part 610 is to the effective tracking coil 430, which will enhance the evenness of the distribution of the magnetic flux lines. However, a sufficient large space must be preserved between the front edge of the protruding part 610 and the objective lens carrier 100, such that the objective lens carrier 100 achieves the predetermined displacement, without crashing the protruding part 610.

Figure 8:
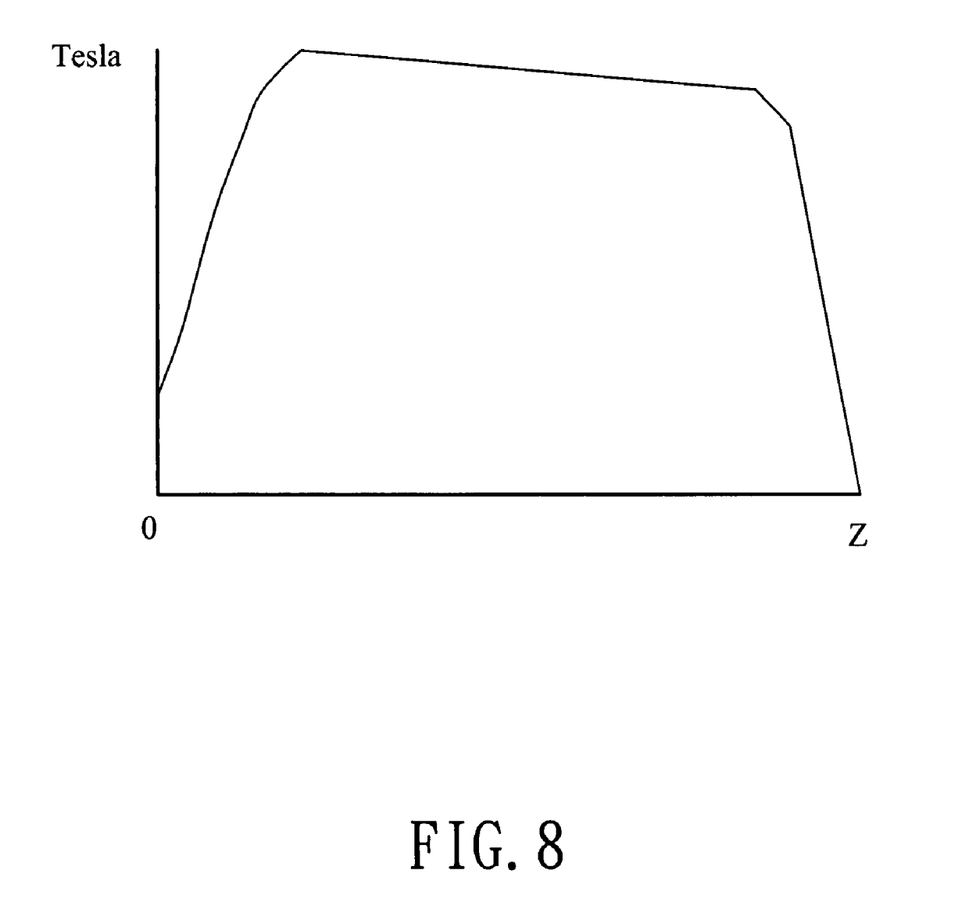
FIG. 8 is a graph chart of the distribution of the magnetic flux in the vertical direction that passes through effective tracking coils in the first embodiment of the present invention.

Referring to FIG. 8, under the attraction of the protruding part 610, the magnetic flux lines over the protruding part 610 are more concentrated and distributed evenly, so the magnetic flux passing through the effective tracking coil 430 along the vertical direction Z can be more evenly distributed. In this way, a plateau region is formed, so that the effective tracking coil 430 is persistently passed through by the same magnetic flux when moving along the vertical direction. Even if the height of the effective tracking coils 430 at opposite surfaces of the objective lens carrier 100 is slightly different from each other due to the tolerance of the elements, the coils are still influenced by the same magnetic flux, thus avoiding producing a force moment to cause an inclining movement.

Figure 9:
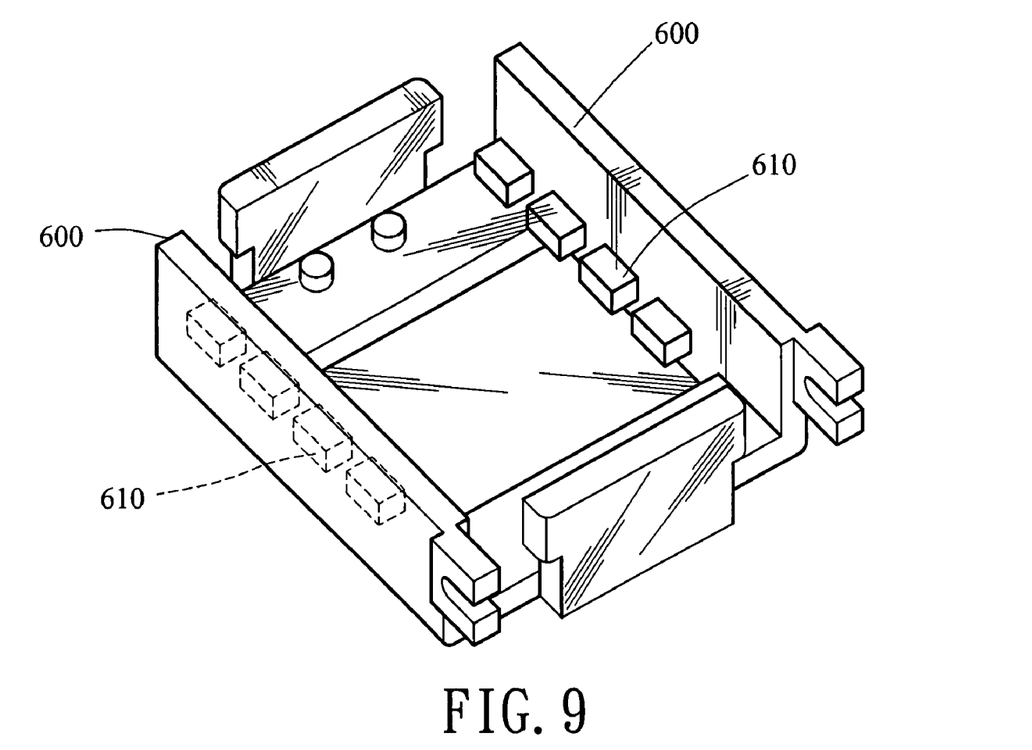
FIG. 9 is an isometric diagram of a part of the elements in a second embodiment of the present invention.
Figure 10:
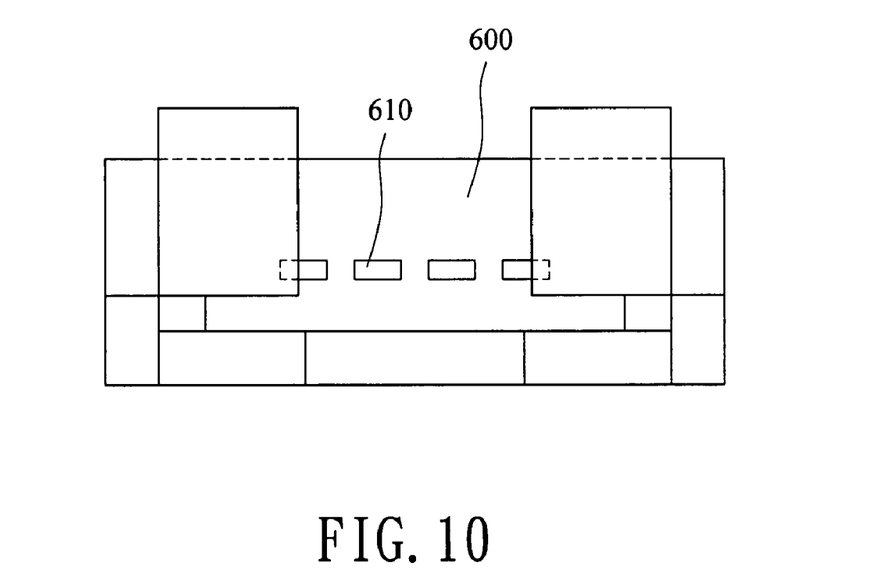
FIG. 10 is a side view of the second embodiment of the present invention.

Referring to FIG. 9 and FIG. 10, they show an electromagnetic actuating device in a second embodiment of the present invention. The second embodiment has yokes 600 in another configuration. The protruding part 610 of each yokes 600 is formed by a plurality of bumps that extends towards the objective lens carrier, and all the bumps are arranged in a row to attract the magnetic flux lines produced by the magnets, so as to make the magnetic flux lines be distributed more evenly along the vertical direction.

Figure 11:
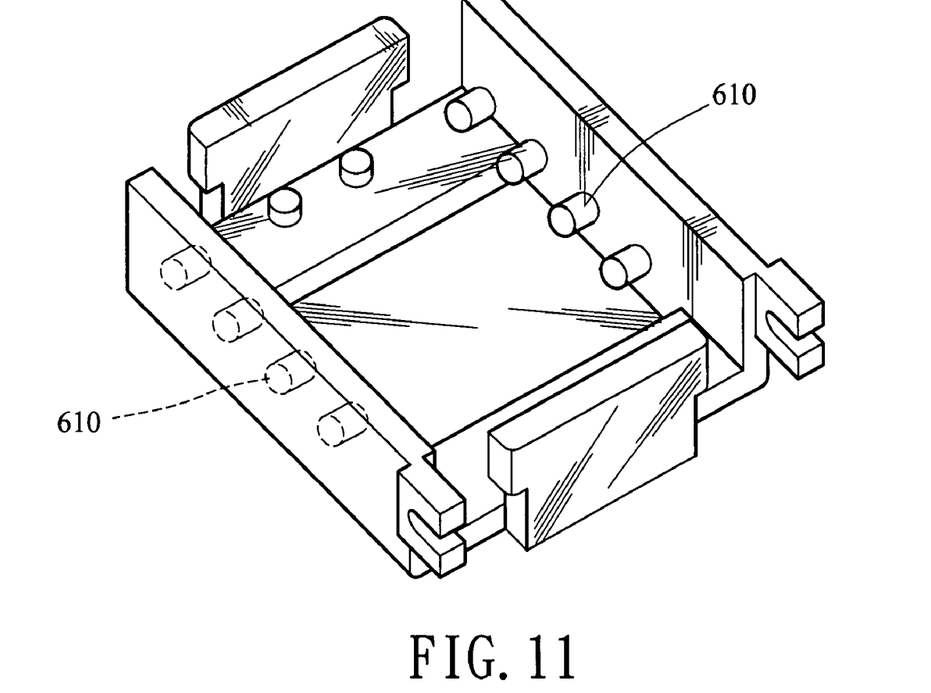
FIG. 11 is an isometric diagram of a part of the elements in a third embodiment of the present invention.
Figure 12:
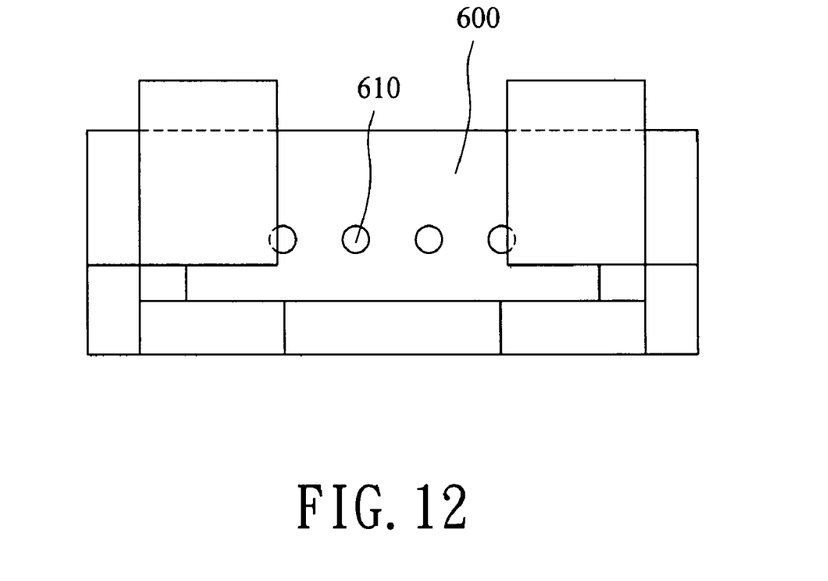
FIG. 12 is a side view of the third embodiment of the present invention.

Referring to FIG. 11 and FIG. 12, they show an electromagnetic actuating device in a third embodiment of the present invention. The third embodiment has yokes in another configuration. The protruding part 610 of each of the yokes 600 is formed by a plurality of cylindrical-shaped posts that extends towards the objective lens carrier 100, and all the cylindrical-shaped posts are arranged in a row to attract the magnetic flux lines produced by the magnets, so as to make the magnetic flux lines be distributed more evenly along the vertical direction.

Figure 13:
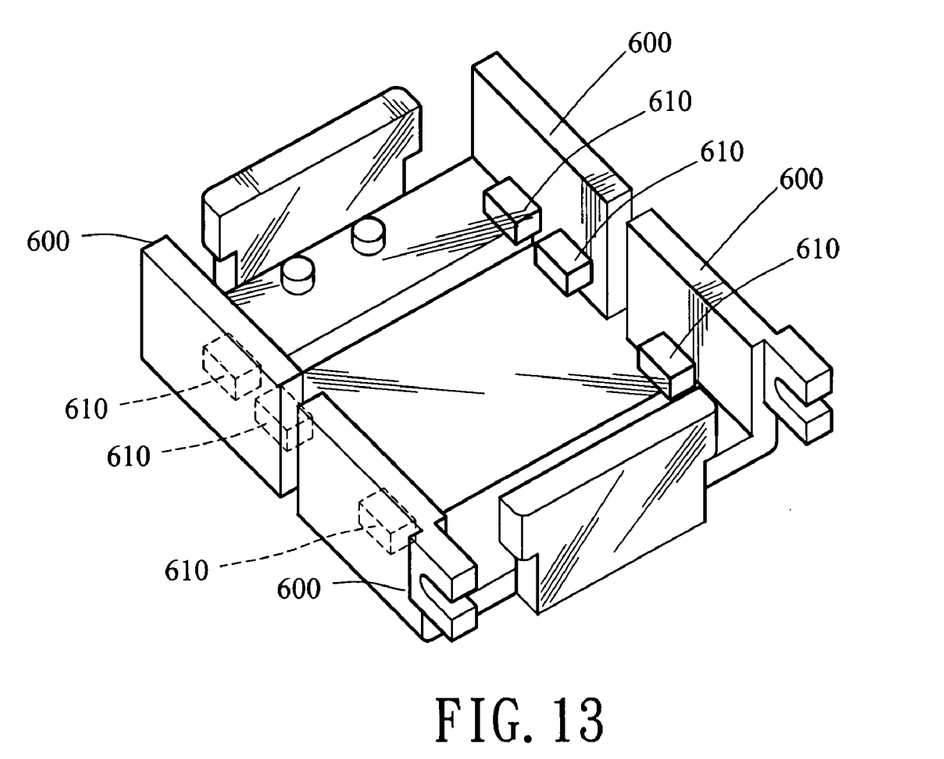
FIG. 13 is an isometric diagram of a part of the elements in a fourth embodiment of the present invention.
Figure 14:
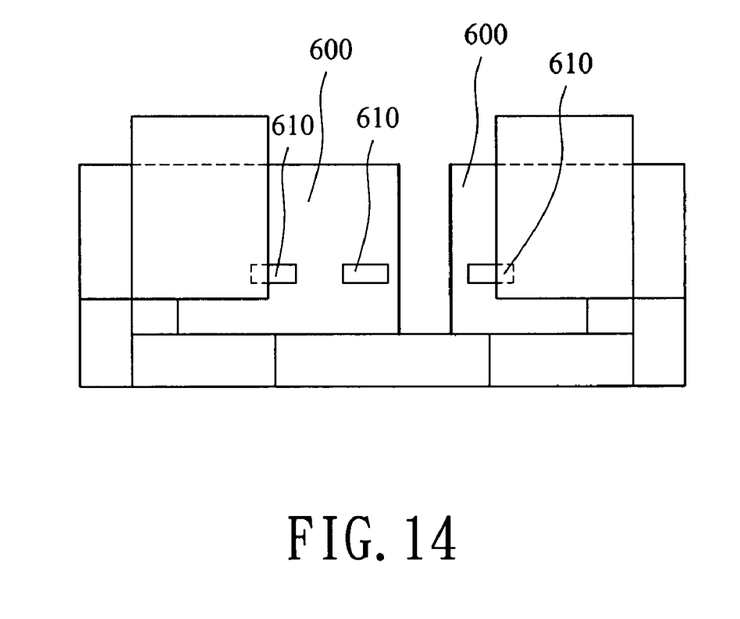
FIG. 14 is a side view of the fourth embodiment of the present invention.

Referring to FIG. 13 and FIG. 14, they show an electromagnetic actuating device in a fourth embodiment of the present invention. In the fourth embodiment, a plurality of yokes 600 is disposed at each side of the objective lens carrier 100, and they together are used to guide the magnetic flux lines to the objective lens carrier. The number of the protruding part 610 of each yoke 600 can be one or more, for attracting the magnetic flux lines produced by the magnets, so as to make the magnetic flux lines be distributed more evenly along the vertical direction.

Figure 15:
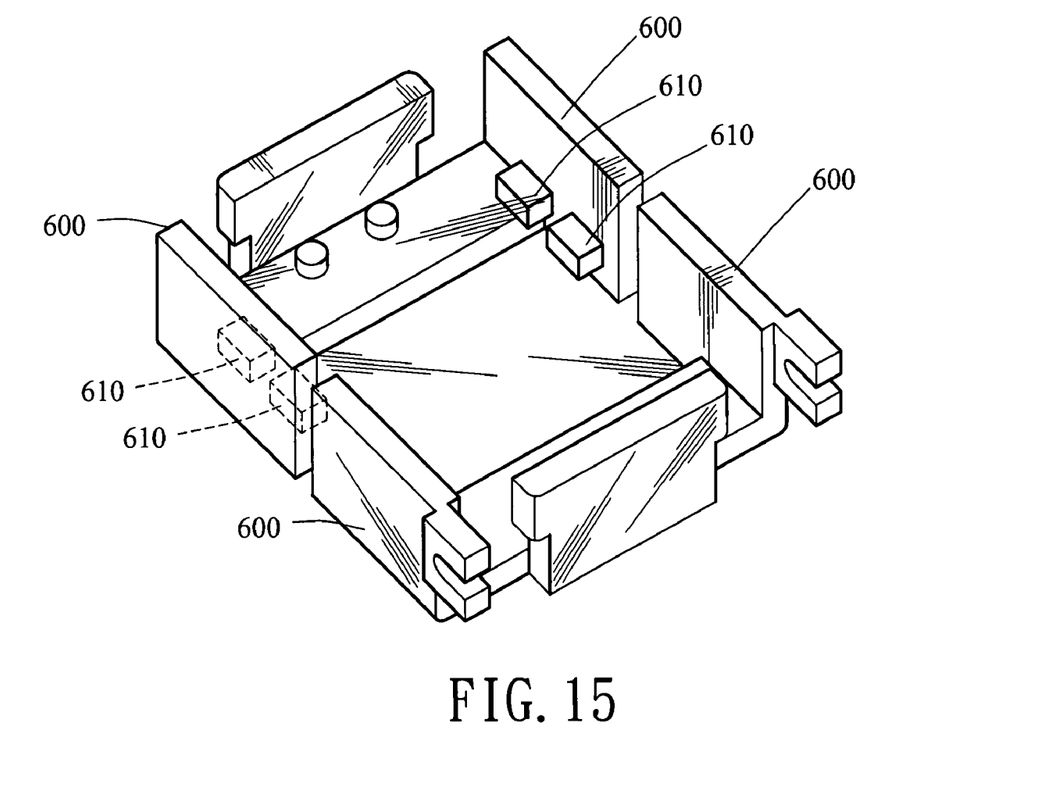
FIG. 15 is an isometric diagram of a part of the elements in a fifth embodiment of the present invention.

Referring to FIG. 15, it shows an electromagnetic actuating device in a fifth embodiment of the present invention. A plurality of yokes 600 is disposed at each side of the objective lens carrier 100, and they together guide the magnet force lines to the objective lens carrier. Not all yokes 600 at each side of the objective lens carrier 100 need to have a protruding part 610, and only one of them is required to have the protruding part 610 and the protruding parts 610 at the two sides of the objective lens carrier are required to be disposed symmetrically, so as to balance the magnetic force.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electromagnetic actuating device, applicable for moving an objective lens carrier having an objective lens assembly, comprising:
    at least one magnet, spaced apart from the objective lens carrier for a distance;
    at least a coil, disposed at the objective lens carrier, for generating an electromagnetic force to interact with the magnet; and
    at least a yoke, spaced apart from the objective lens carrier for a distance, wherein the yoke has a protruding part that extends towards the objective lens carrier and used to attract magnetic flux lines produced by the magnet, wherein the protruding part comprises a plurality of cylindrical-shaped posts.

2. The electromagnetic actuating device as claimed in claim 1, further comprising a fixing post disposed at a bottom of the magnet for fixing the magnet and adjusting a height of the magnet.

3. An optical pickup head, applicable for moving an objective lens assembly, comprising:
    an objective lens carrier, for carrying the objective lens assembly, wherein a vertical direction, a first horizontal direction, and a second horizontal direction that are vertical to each other are defined on the objective lens carrier;
    two supporting yokes, arranged along a first horizontal axial direction and spaced apart from each other by the objective lens carrier, such that the objective lens carrier is located between the two supporting yokes;

two magnets, respectively fixed on inner surfaces of the supporting yokes that are facing each other, such that the objective lens carrier is located between the two magnets;

at least a focusing coil, winding around the objective lens carrier, wherein a normal direction of the focusing coil is parallel to the vertical direction;

a plurality of tracking coils, disposed at the objective lens carrier, wherein a normal direction of the tracking coil is vertical to the vertical direction and parallel to a plane formed by the first horizontal direction and the second horizontal direction; and two yokes, arranged along the second horizontal axial direction and spaced apart from each other by the objective lens carrier, such that the objective lens carrier is located between the two yokes, wherein a protruding part is protruded from an inner surface of each yoke and extends towards the objective lens carrier.

4. The optical pickup head as claimed in claim 3, further comprising a circuit board and a plurality of metal lines, wherein the circuit board is fixed on one of the supporting yokes to receive electric power input from an external device; one end of the metal line is electrically connected to the circuit board, and other end is electrically connected to the focusing coil and the plurality of tracking coils.

5. The optical pickup head as claimed in claim 3, wherein the protruding part is a long sheet.

6. The optical pickup head as claimed in claim 5, wherein the protruding part comprises a plurality of bumps arranged in a row.

7. The optical pickup head as claimed in claim 5, wherein the protruding part comprises a plurality of cylindrical-shaped posts arranged in a row.

8. The optical pickup head as claimed in claim 3, further comprising a fixing post disposed at a bottom of the magnet, for fixing the magnet and adjusting a height of the magnet.

* * * * *

INTER PARTES REEXAMINATION CERTIFICATE (1226th)
United States Patent
Peng et al.

(10) Number: US 7,672,198 C1
(45) Certificate Issued: Feb. 2, 2016

(54) OPTICAL PICKUP HEAD AND ELECTROMAGNETIC ACTUATING DEVICE THEREOF

(75) Inventors: Ming-Tsan Peng, Hsinchu (TW); Chun-Te Wu, Hsinchu (TW); Chi-Shen Chang, Hsinchu (TW); Kwen-Jin Lee, Hsinchu (TW); Tzuan-Ren Jeng, Hsinchu (TW); Lei-Ming Yang, Hsinchu (TW); Chau-Yuan Ke, Hsinchu (TW); Jau-Jiu Ju, Hsinchu (TW); Shyh-Jier Wang, Hsinchu (TW); Hai-Jo Huang, Hsinchu (TW)

(73) Assignee: Industrial Technology Research Institute

Reexamination Request:
No. 95/002,236, Sep. 13, 2012

Reexamination Certificate for:
Patent No.: 7,672,198
Issued: Mar. 2, 2010
Appl. No.: 11/727,821
Filed: Mar. 28, 2007

(30) Foreign Application Priority Data

Dec. 27, 2006 (TW) ............... 95149334 A (51) Int. Cl.
*G11B 7/00* (2006.01)
*G11B 7/09* (2006.01)
*G11B 7/095* (2006.01)

(52) U.S. Cl.
CPC ............ *G11B 7/0933* (2013.01); *G11B 7/0935* (2013.01); *G11B 7/0956* (2013.01)

(58) Field of Classification Search
None
See application file for complete search history.

(56) References Cited

To view the complete listing of prior art documents cited during the proceeding for Reexamination Control Number 95/002,236, please refer to the USPTO's public Patent Application Information Retrieval (PAIR) system under the Display References tab.

*Primary Examiner* — Christina Y Leung (57) ABSTRACT

An optical pickup head and an electromagnetic actuating device thereof are provided. The electromagnetic actuating device is used to move an objective lens carrier having an objective lens assembly to form an optical pickup head. The electromagnetic actuating device includes at least a magnet, at least a coil, and at least a yoke. The magnet is spaced apart from the objective lens carrier by a distance, and the coil is disposed at the objective lens carrier, for generating an electromagnetic force to interact with the magnet. The yoke is spaced apart from the objective lens carrier by a distance, in which the yoke has a protruding part that extends towards the objective lens carrier and is used to attract magnetic flux lines produced by the magnet, and thus making the magnetic flux that passes through the coil be distributed evenly.

INTER PARTES REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 5-7 are cancelled.

Claim 3 is determined to be patentable as amended.

Claims 4 and 8, dependent on an amended claim, are determined to be patentable.

New claims 9-17 are added and determined to be patentable.

Claims 1 and 2 were not reexamined.

3. An optical pickup head, applicable for moving an objective lens assembly, comprising:
- an objective lens carrier, for carrying the objective lens assembly, wherein a vertical direction, a first horizontal direction, and a second horizontal direction that are vertical to each other are defined on the objective lens carrier;
- two supporting yokes, arranged along a first horizontal axial direction and spaced apart from each other by the objective lens carrier, such that the objective lens carrier is located between the two supporting yokes;
- two magnets, respectively fixed on inner surfaces of the supporting yokes that are facing each other, such that the objective lens carrier is located between the two magnets;
- at least a focusing coil, winding around the objective lens carrier, wherein a normal direction of the focusing coil is parallel to the vertical direction;
- a plurality of tracking coils, disposed at the objective lens carrier, wherein a normal direction of the tracking coil is vertical to the vertical direction and parallel to a plane formed by the first horizontal direction and the second horizontal direction; and
- two yokes, arranged along the second horizontal axial direction and spaced apart from each other by the objective lens carrier, such that the objective lens carrier is located between the two yokes, wherein a protruding part is protruded from an inner surface of each yoke and extends towards the objective lens carrier,
- wherein each protruding part includes a front edge opposite the yoke from which the protruding part protrudes and facing the objective lens carrier, and each protruding part protrudes to a predetermined distance in the second horizontal axial direction such that a space is provided in the second horizontal axial direction between the front edge of the protruding part and a nearest one of the plurality of tracking coils on the objective lens carrier, and
- *wherein the protruding part is a long sheet having a length in the first horizontal direction that is greater than a length in the first horizontal direction of the nearest one of the plurality of tracking coils.*

*9. The optical pickup head as claimed in claim 3, wherein the protruding part is located below, in the vertical direction, a bottom surface of the nearest one of the plurality of tracking coils.*

*10. The optical pickup head as claimed in claim 3, wherein a distance in the first horizontal direction between an edge of the protruding part and a nearest one of the two supporting yokes is smaller than a thickness in the first horizontal direction of the magnet fixed on the nearest one of the two supporting yokes.*

*11. An optical pickup head, applicable for moving an objective lens assembly, comprising:*
- *an objective lens carrier, for carrying the objective lens assembly, wherein a vertical direction, a first horizontal direction, and a second horizontal direction that are vertical to each other are defined on the objective lens carrier;*
- *two supporting yokes, arranged along a first horizontal axial direction and spaced apart from each other by the objective lens carrier, such that the objective lens carrier is located between the two supporting yokes;*
- *two magnets, respectively fixed on inner surfaces of the supporting yokes that are facing each other, such that the objective lens carrier is located between the two magnets;*
- *at least a focusing coil, winding around the objective lens carrier, wherein a normal direction of the focusing coil is parallel to the vertical direction;*
- *a plurality of tracking coils, disposed at the objective lens carrier, wherein a normal direction of the tracking coil is vertical to the vertical direction and parallel to a plane formed by the first horizontal direction and the second horizontal direction; and*
- *two yokes, arranged along the second horizontal axial direction and spaced apart from each other by the objective lens carrier, such that the objective lens carrier is located between the two yokes, wherein a protruding part is protruded from an inner surface of each yoke and extends towards the objective lens carrier,*
- *wherein each protruding part includes a front edge opposite the yoke from which the protruding part protrudes and facing the objective lens carrier, and each protruding part protrudes to a predetermined distance in the second horizontal axial direction such that a space is provided in the second horizontal axial direction between the front edge of the protruding part and a nearest one of the plurality of tracking coils on the objective lens carrier, and*
- *wherein a distance in the first horizontal direction between an edge of the protruding part and a nearest one of the two supporting yokes is smaller than a thickness in the first horizontal direction of the magnet fixed on the nearest one of the two supporting yokes.*

*12. The optical pickup head as claimed in claim 11, further comprising a circuit board and a plurality of metal lines, wherein the circuit board is fixed on one of the supporting yokes to receive electric power input from an external device; one end of the metal line is electrically connected to the circuit board, and other end is electrically connected to the focusing coil and the plurality of tracking coils.*

*13. The optical pickup head as claimed in claim 11, wherein the protruding part is a long sheet.*

*14. The optical pickup head as claimed in claim 11, wherein the protruding part comprises a plurality of bumps arranged in a row.*

15. The optical pickup head as claimed in claim 11, wherein the protruding part comprises a plurality of cylindrical-shaped posts arranged in a row.

16. The optical pickup head as claimed in claim 11, further comprising a fixing post disposed at a bottom of the magnet, for fixing the magnet and adjusting a height of the magnet.

17. The optical pickup head as claimed in claim 11, wherein the protruding part is located below, in the vertical direction, a bottom surface of the nearest one of the plurality of tracking coils.

* * * * *